(12) United States Patent
Suzuki

(10) Patent No.: US 10,019,786 B2
(45) Date of Patent: Jul. 10, 2018

(54) IMAGE-PROCESSING APPARATUS AND IMAGE-PROCESSING METHOD

(71) Applicant: CANON KABUSHIKI KAISHA, Tokyo (JP)

(72) Inventor: Yasuo Suzuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 50 days.

(21) Appl. No.: 15/244,315

(22) Filed: Aug. 23, 2016

(65) Prior Publication Data

US 2017/0061595 A1    Mar. 2, 2017

(30) Foreign Application Priority Data

Aug. 26, 2015   (JP) .................................. 2015-166561

(51) Int. Cl.
*G06T 5/00* (2006.01)
*G06T 5/40* (2006.01)

(52) U.S. Cl.
CPC .............. *G06T 5/009* (2013.01); *G06T 5/40* (2013.01); *G06T 2207/20208* (2013.01)

(58) Field of Classification Search
CPC . G06T 5/009; G06T 5/40; G06T 2207/20208; G09G 2320/0233; H04N 5/3651
See application file for complete search history.

(56) References Cited

U.S. PATENT DOCUMENTS

| 5,936,684 A * | 8/1999 | Murayama | H04N 5/20 348/671 |
| 8,218,868 B2 * | 7/2012 | Stern | G06T 5/009 382/168 |
| 9,378,706 B2 * | 6/2016 | Cha | G09G 5/10 |
| 2010/0209015 A1 * | 8/2010 | Yu et al. | G06T 5/009 382/270 |
| 2010/0329559 A1 * | 12/2010 | Shindo | G06T 5/009 382/172 |
| 2015/0016722 A1 * | 1/2015 | Onda | H04N 9/3179 382/167 |
| 2015/0348467 A1 * | 12/2015 | Gyu | G09G 3/3611 345/690 |

FOREIGN PATENT DOCUMENTS

JP    2008-310261 A    12/2008

* cited by examiner

*Primary Examiner* — Antonio A Caschera
(74) *Attorney, Agent, or Firm* — Cowan, Liebowitz & Latman, P.C.

(57) ABSTRACT

An image-processing apparatus includes: an acquiring unit configured to acquire a brightness characteristic value from input image data; a generating unit configured to generate information regarding a high-brightness area that is an image area of the input image data having a brightness greater than or equal to a first threshold value, based on the brightness characteristic value; and a processing unit configured to perform, on the input image data, unevenness reduction processing of reducing unevenness in at least one of brightness and color, wherein the processing unit performs, on the input image data, the unevenness reduction processing of reducing the unevenness more strongly in a case where the high-brightness area is bigger, based on the information.

19 Claims, 13 Drawing Sheets

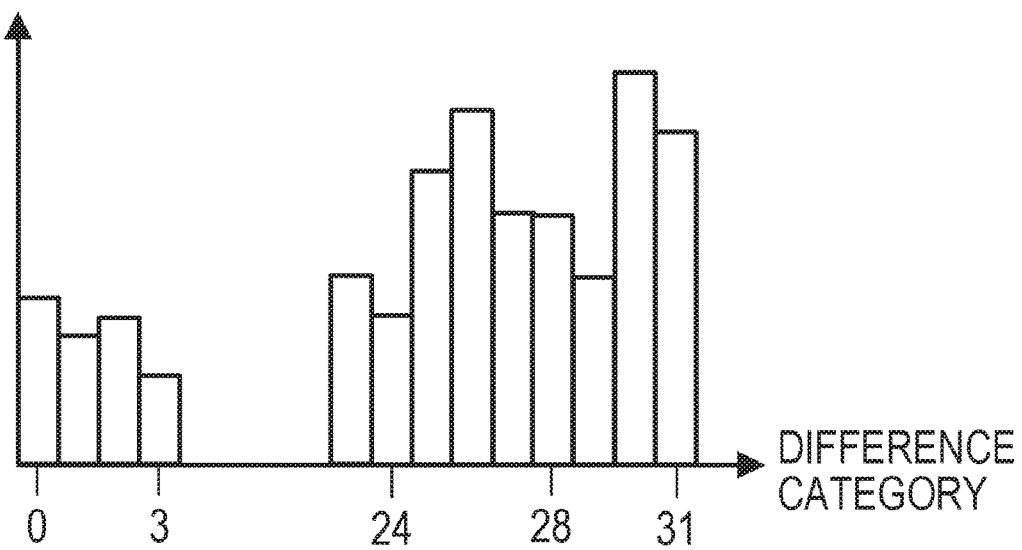

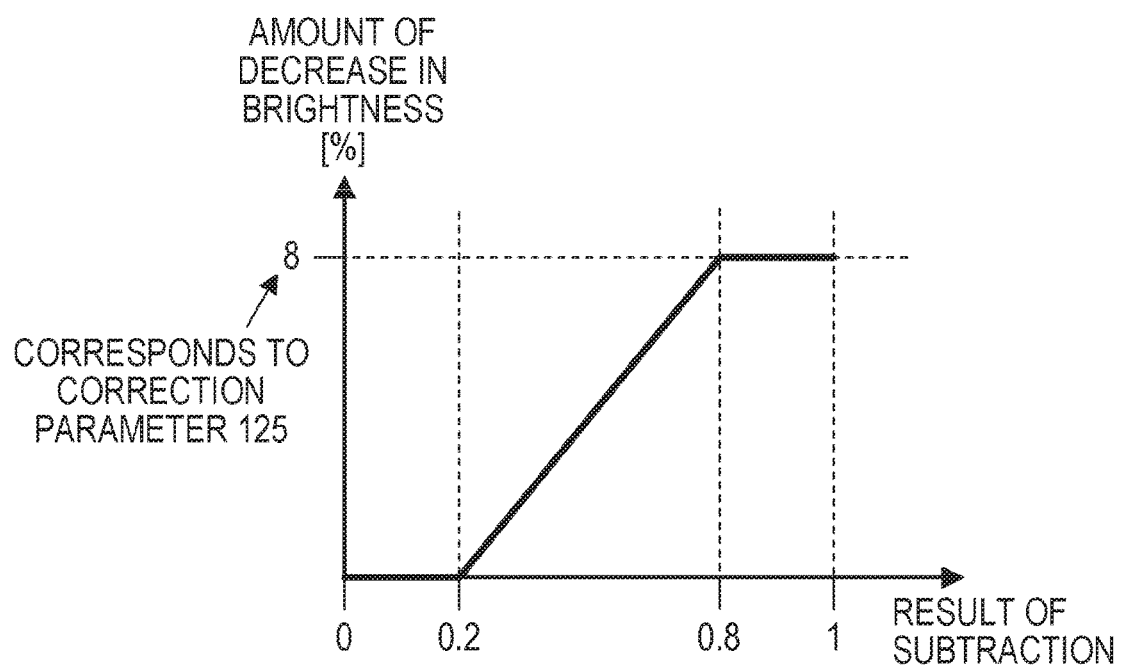

form for HDR image data, data formats having gradation
characteristics (log characteristics) such that the gradation
value increases logarithmically with respect to an increase in
brightness have been proposed. For example, at movie
production sites, Cineon log that has been specified based on
the characteristics of a film with a wide dynamic range has
been used as a data format.

With the improvement in display performance of image
display apparatuses, display at a high contrast of several
hundred thousand to one, display at a brightness of several
thousand candelas, and the like are now performed. For
example, in liquid crystal display apparatuses, display of
high contrast can be realized by local dimming control using
a backlight that illuminates a liquid crystal panel. By
increasing the brightness of light emitted by the backlight,
high-brightness display can be realized.

Studies are made on an image production workflow for
displaying an image based on HDR image data in an image
display apparatus capable of realizing high-contrast and
high-brightness display. Conventionally, Rec. 709 and the
like have been used as a transmission standard for transmitting
image data to an image display apparatus. However,
with conventional transmission standards, the dynamic
range was limited to a narrow range, and the brightness was
limited, to low brightness. Therefore, conventionally, image
data was converted to image data for Rec. 709 by image
editing involving range compression to narrow the dynamic
range, and the image data after conversion was transmitted
to an image display apparatus. Then, in the image display
apparatus, an image was displayed using only part of the
capabilities of the image display apparatus. That is, due to
the limitations of the transmission standards, there have
been losses in the dynamic range of image data.

In this regard, studies are being made on a transmission
scheme to maintain the dynamic range of HDR image data.
In the transmission scheme to maintain the dynamic range of
HDR image data, conversion such as that shown in FIGS. 10
and 11 is performed. First, as shown in FIG. 10, each
gradation value of HDR image data is converted to brightness
"cd". The conversion characteristics for converting the
gradation value to the brightness are not limited to the
conversion characteristics shown in FIG. 10. For example,
in a case of editing an image, an image producer decides on
the brightness for display of each gradation value, and,
based on the result of decision, determines the conversion
characteristics for converting the gradation value to the
brightness. Next, as shown in FIG. 11, each brightness of
HDR image data is converted to the gradation value. The
conversion characteristics for converting the brightness to
the gradation value are not limited to the conversion characteristics
shown in FIG. 11. For example, the conversion
characteristics for converting the brightness to the gradation
value are determined based on the visual ability to discriminate
brightness.

In an image display apparatus, unevenness (display
unevenness) in at least one of brightness and color occurs in
a screen in a case of displaying an image in the screen.
Therefore, in the image display apparatus, unevenness
reduction processing of reducing the display unevenness is
performed. For example, brightness unevenness is measured
in advance using a measuring instrument. As shown in FIG.
12, a plurality of divided areas forming a screen area are
specified in advance. Based on the result of measurement,
processing of reducing the brightness of a divided area
where the brightness is high to the brightness of a divided
area where the brightness is low is performed as the unevenness
reduction processing.

However, general unevenness reduction processing
causes a decrease in display brightness (brightness on the
screen). For example, in the unevenness reduction processing
described above, the display brightness decreases since
the brightness of a divided area where the brightness is high
is reduced to the brightness of a divided area where the
brightness is low. Therefore, the unevenness reduction processing
limits the upper limit value of display brightness to
a low value and generates a gradation value (gradation
range) with which the brightness of image data cannot be
reproduced accurately.

Thus, a technique is proposed in which the upper limit
value of display brightness is maintained by reducing the
degree of reduction in display unevenness by the unevenness
reduction processing to a smaller value for a higher gradation
value (for example, see Japanese Patent Application
Laid-open No. 2008-310261).

SUMMARY OF THE INVENTION

The technique of Japanese Patent Application Laid-open
No. 2008-310261 can be used suitably with respect to image
data with which display unevenness is relatively unnoticeable.
However, using the technique of Japanese Patent
Application Laid-open No. 2008-310261 with respect to
image data with which brightness unevenness is highly
noticeable may not sufficiently reduce the display unevenness
in a high-gradation area (area where the gradation value
is high), such that the display unevenness in the high-gradation
area is noticeable. Since an area where the gradation
value is high is also an area where the brightness is
high, it can be said that the high-gradation area is a "high-brightness
area." Generally, display unevenness is more
noticeable in a case where the size of an area formed of
pixels having approximately the same gradation value is
bigger. Therefore, with the technique of Japanese Patent
Application Laid-open No. 2008-310261, display unevenness
in a high-gradation area is not reduced sufficiently, and
the display unevenness in the high-gradation area is noticeable,
in the case where the size of the high-gradation area is
large.

FIG. 13 is a representation showing an example of an
image. In the example of FIG. 13, a high-gradation area
(high-brightness area) of a large size exists in the middle,
and a medium-gradation area (medium-brightness area) of a
small size exists around the high-gradation area. The
medium-gradation area is an area where the gradation value
is neither high nor low. In the case where the image of FIG.
13 is displayed in a screen, the brightness unevenness in the
high-gradation area is noticeable, since the size of the
high-brightness area is large. On the other hand, the brightness unevenness in the medium-brightness area is not as noticeable, since the size of the medium-brightness area is small.

Since using the technique of Japanese Patent Application Laid-open No. 2008-310261 upon displaying the image of FIG. 13 reduces the degree of reduction in display unevenness of the high-brightness area, the display unevenness in the high-brightness area is noticeable even after unevenness reduction processing. In terms of improving the image quality, it is more preferable to sufficiently reduce the display unevenness than to maintain the display brightness, with respect to a high-brightness area of a large size. As the size of a high-brightness area increases, the degree of glare perceived by a user increases, and the visibility of an image decreases. Therefore, in terms of improving the visibility as well, it is more preferable to sufficiently reduce the display unevenness than to maintain the display brightness, with respect to a high-brightness area of a large size. On the other hand, the brightness unevenness in a high-brightness area of a small size is unnoticeable. Therefore, in terms of improving the image quality, it is more preferable to maintain the display brightness than to sufficiently reduce the display unevenness, with respect to a high-brightness area of a small size.

Thus, the present invention provides a technique that can suitably suppress a decrease in display brightness and that can suitably reduce display unevenness.

The present invention in its first aspect provides an image-processing apparatus comprising:

an acquiring unit configured to acquire a brightness characteristic value from input image data;

a generating unit configured to generate information regarding a high-brightness area that is an image area of the input image data having a brightness greater than or equal to a first threshold value, based on the brightness characteristic value acquired by the acquiring unit; and a processing unit configured to perform, on the input image data, unevenness reduction processing of reducing unevenness in at least one of brightness and color, wherein the processing unit performs, on the input image data, the unevenness reduction processing of reducing the unevenness more strongly in a case where the high-brightness area is bigger, based on the information generated by the generating unit.

The present invention in its second aspect provides an image-processing method comprising:

an acquiring step of acquiring a brightness characteristic value from input image data;

a generating step of generating information regarding a high-brightness area that is an image area of the input image data having a brightness greater than or equal to a first threshold value, based on the brightness characteristic value acquired in the acquiring step; and a processing step of performing, on the input image data, unevenness reduction processing of reducing unevenness in at least one of brightness and color, wherein in the processing step, the unevenness reduction processing of reducing the unevenness more strongly in a case where the high-brightness area is bigger, based on the information generated in the generating step is performed on the input image data.

The present invention in its third aspect provides a non-transitory computer readable medium that stores a program, wherein the program causes a computer to execute an acquiring step of acquiring a brightness characteristic value from input image data;

a generating step of generating information regarding a high-brightness area that is an image area of the input image data having a brightness greater than or equal to a first threshold value, based on the brightness characteristic value acquired in the acquiring step; and a processing step of performing, on the input image data, unevenness reduction processing of reducing unevenness in at least one of brightness and color, and in the processing step, the unevenness reduction processing of reducing the unevenness more strongly in a case where the high-brightness area is bigger, based on the information generated in the generating step is performed on the input image data.

With the present invention, a decrease in display brightness can suitably be suppressed, and display unevenness can suitably be reduced.

Further features of the present invention will become apparent from the following description of exemplary embodiments with reference to the attached drawings.

BRIEF DESCRIPTION OF THE DRAWINGS

FIG. 8 is a diagram showing an example of a histogram of brightness difference according to Embodiment 2;

FIG. 9 is a diagram showing an example of the relationship of a result of subtraction and an amount of decrease in brightness according to Embodiment 2;

DESCRIPTION OF THE EMBODIMENTS

Embodiment 1

An image-processing apparatus and an image-processing method according to Embodiment 1 of the present invention will be described below. While an example in which the image-processing apparatus according to this embodiment is provided to an image display apparatus is described below, the image-processing apparatus according to this embodiment may be an apparatus separate from the image display apparatus.

Figure 1:
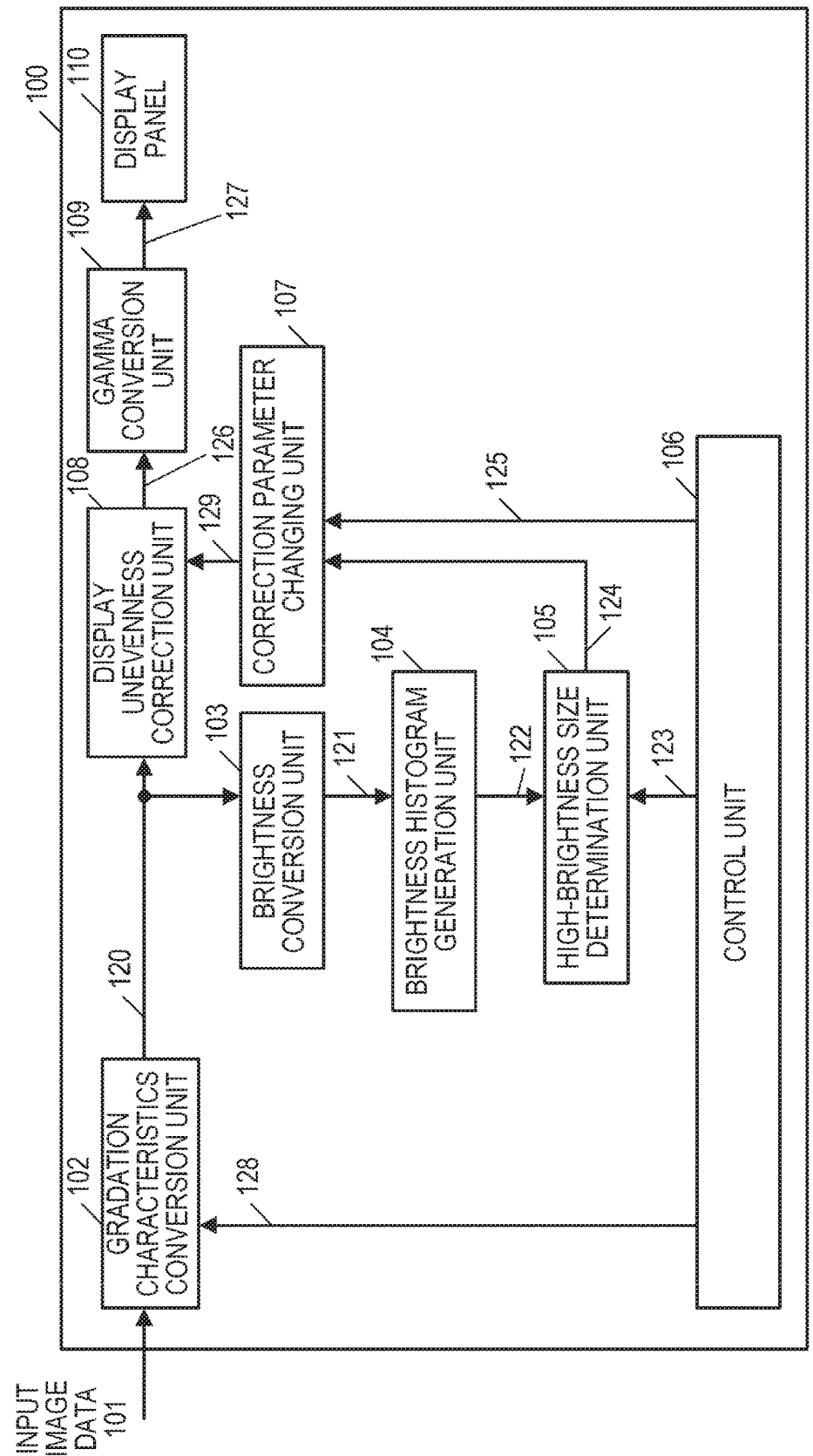
FIG. 1 is a block diagram showing an example of the functional configuration of an image display apparatus according to Embodiment 1.

FIG. 1 is a block diagram showing an example of the functional configuration of an image display apparatus 100 according to this embodiment. As shown in FIG. 1, the image display apparatus 100 includes a control unit 106, a gradation characteristics conversion unit 102, a brightness conversion unit 103, a brightness histogram generation unit 104, a high-brightness size determination unit 105, a correction parameter changing unit 107, a display unevenness correction unit 108, a gamma conversion unit 109, and a display panel 110. In the case where the image-processing apparatus according to this embodiment is an apparatus separate from the image display apparatus, the display panel 110 may be provided to the image display apparatus instead of the image-processing apparatus. Further, the gamma conversion unit 109 may be provided to the image display apparatus instead of the image-processing apparatus.

Figure 11:
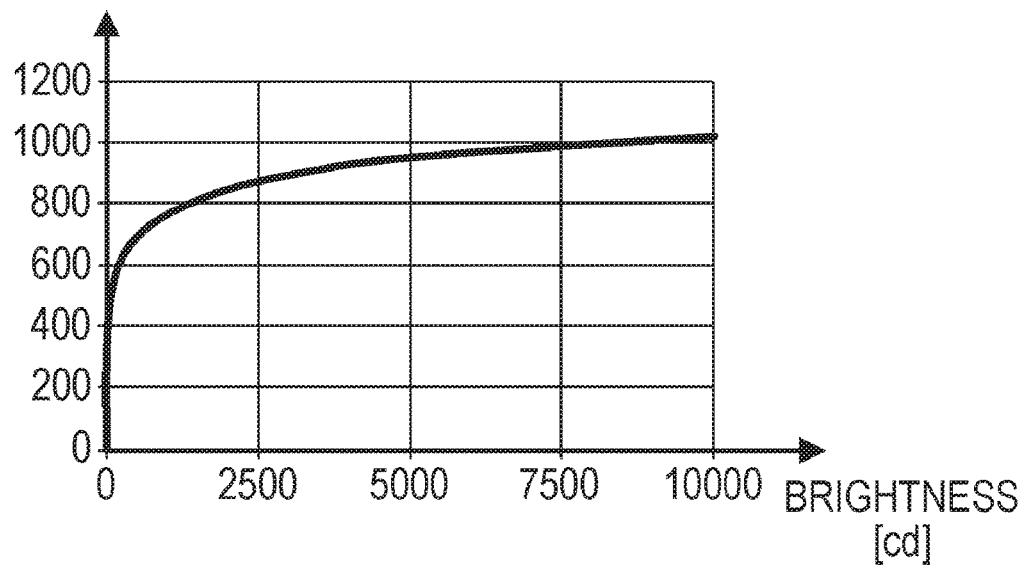
FIG. 11 is a diagram showing an example of conversion characteristic upon converting brightness to HDR image data.

Input image data 101 is image data that has been input to the image display apparatus 100. The dynamic range and gradation characteristics of the input image data 101 are not particularly limited. For example, high-dynamic-range (HDR) image data that is image data having a wide dynamic range is input to the image display apparatus 100 as the input image data 101. Non-linear image data that is image data having gradation characteristics such that the gradation value increases non-linearly with respect to an increase in brightness may be input to the image display apparatus 100 as the input image data 101. In this embodiment, the input image data 101 is, as shown in FIG. 11, HDR image data having gradation characteristics (log characteristics) such that the gradation value increases logarithmically with respect to an increase in brightness. The transmission method, pixel value, and the number of bits of the input image data 101 are also not particularly limited. In this embodiment, image data in which the number of bits is 10 and the pixel value is an RGB value (combination of an R value, a G value, and a B value) is input to the image display apparatus 100 as the input image data 101 by serial digital interface (SDI) transmission. The R value is a gradation value corresponding to red, the G value is a gradation value corresponding to green, and the B value is a gradation value corresponding to blue.

The control unit 106 sets a parameter used in each functional unit. For example, upon activation of the image display apparatus 100, the control unit 106 reads the default value of each parameter from a non-volatile memory (not shown) and sets each read parameter. The control unit 106 can also change the setting value of a parameter. For example, the control unit 106 changes the setting value of a parameter in accordance with an instruction from a user.

The gradation characteristics conversion unit 102 converts the gradation characteristics of the input image data 101 using a conversion characteristics parameter 128 set by the control unit 106. Specifically, the gradation characteristics conversion unit 102 converts the input image data 101 that is non-linear image data to linear image data 120 that is image data having gradation characteristics (linear characteristics) such that the gradation value increases linearly with respect to an increase in brightness. The gradation characteristics conversion unit 102 outputs the linear image data 120 to the brightness conversion unit 103 and the display unevenness correction unit 108. The linear image data 120 can also be referred to as "input image data."

Figure 2:
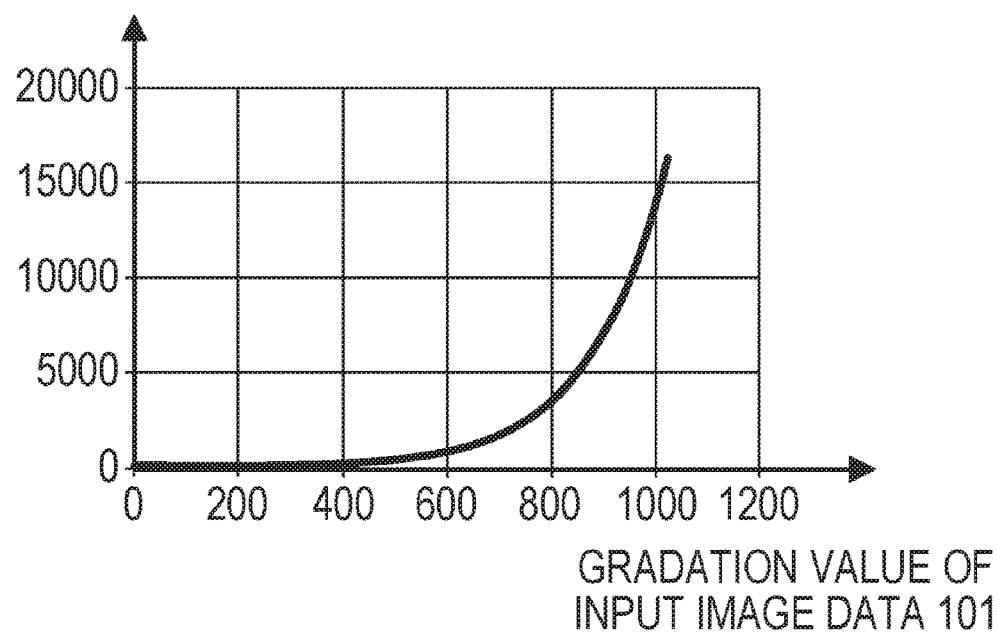
FIG. 2 is a diagram showing an example of a conversion characteristics parameter according to Embodiment 1.

The conversion characteristics parameter 128 shows the correspondence relationship of the gradation value of the input image data 101 and the gradation value of the linear image data 120. The correspondence relationship of the gradation value of the input image data 101 and the gradation value of the linear image data 120 can be determined in advance based on the gradation characteristics of the input image data 101. In this embodiment, as shown in FIG. 2, the conversion characteristics of the conversion characteristics parameter 128 (characteristics of change in gradation value of the linear image data 120 with respect to change in gradation value of the input image data 101) are inverse characteristics of the log characteristics. The conversion characteristics in FIG. 2 can be determined in advance based on the gradation characteristics in FIG. 11. The pixel value and the number of bits of the linear image data 120 are also not particularly limited. In this embodiment, image data in which the number of bits is 14 and the pixel value is an RGB value is generated as the linear image data 120.

The image display apparatus 100 may not include the gradation characteristics conversion unit 102. For example, in the case where the gradation characteristics of the input image data 101 are linear characteristics, the gradation characteristics conversion unit 102 is unnecessary. In the case where information regarding the gradation characteristics of the input image data 101 is stored in the image display apparatus 100, various processing described above can suitably be performed in consideration of the gradation characteristics of the input image data 101.

The brightness characteristic value is acquired from input image data by the brightness conversion unit and the brightness histogram generation unit 104. In this embodiment, the brightness value of each pixel of the linear image data 120 is acquired as the brightness characteristic value from the linear image data 120. In this embodiment, the brightness characteristic value is acquired from image data corresponding to a divided area, for each of a plurality of divided areas forming a screen area of the image display apparatus 100. One brightness characteristic value corresponding to an entire screen may be acquired instead of a plurality of brightness characteristic values corresponding to the plurality of divided areas.

Figure 12:
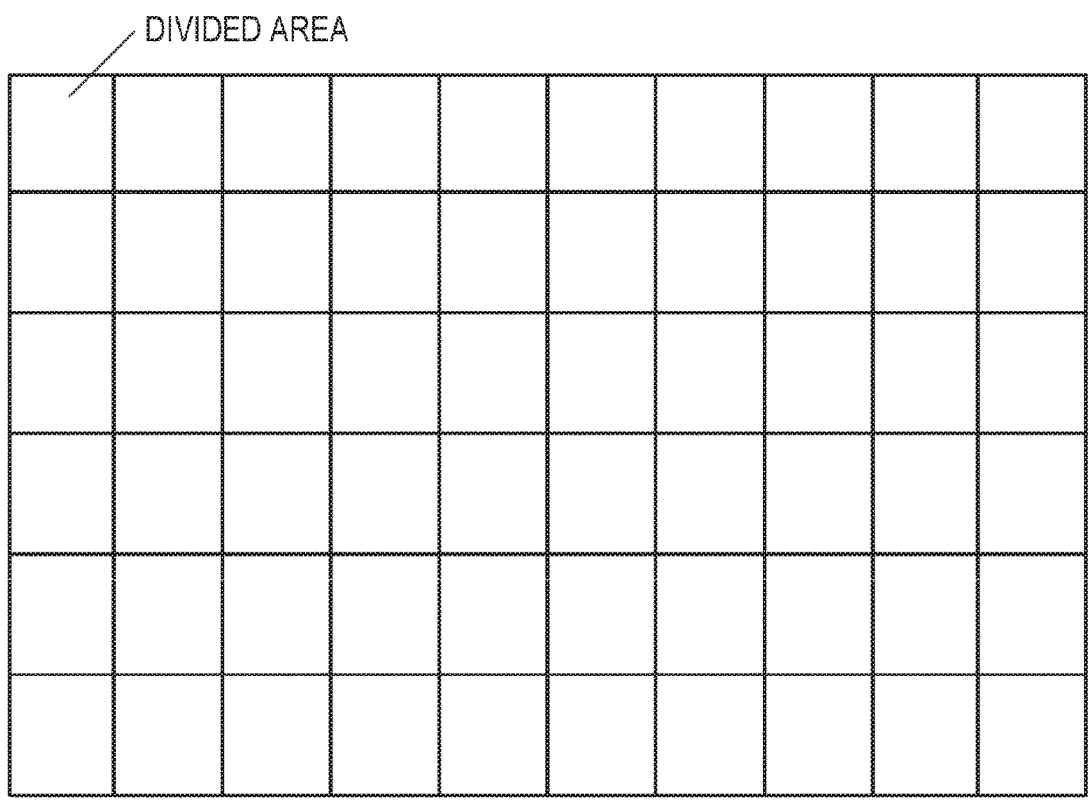
FIG. 12 is a representation showing an example of divided areas.
Figure 13:
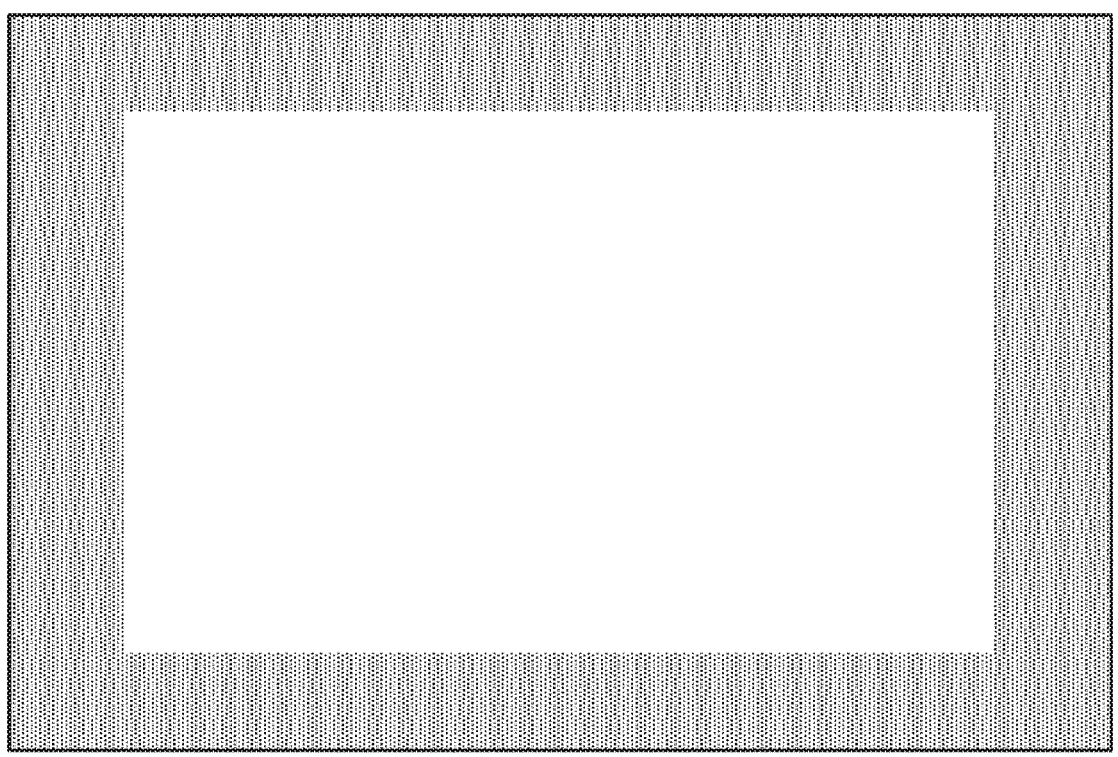
FIG. 13 is a representation showing an example of an image.

An example of the divided areas is shown in FIG. 12. In FIG. 12, the screen area is configured of 60 divided areas in six rows and ten columns. The number of divided areas, the arrangement, and the size are also not particularly limited. For example, the number of divided areas may be more than or less than 60. The screen area may be configured of a plurality of divided areas arranged in a houndstooth pattern.

For each pixel of the linear image data 120, the brightness conversion unit 103 converts the pixel value (RGB value) to the brightness value (Y value). Accordingly, brightness data 121 is generated. The brightness conversion unit 103 outputs the brightness data 121 to the brightness histogram generation unit 104.

The brightness histogram generation unit 104 generates a brightness histogram from the brightness data 121. The brightness histogram generation unit 104 outputs information representing the generated brightness histogram to the high-brightness size determination unit 105 as brightness histogram information 122. In this embodiment, a brightness histogram is generated from brightness data corresponding to a divided area, for each of the plurality of divided areas.

Based on the brightness characteristic value of the linear image data 120, the high-brightness size determination unit 105 generates, as high-brightness size information 124, information regarding the number of high-brightness pixels that are pixels of the linear image data 120 having a brightness greater than or equal to a first threshold value. It can also be said that the high-brightness size information 124 is "information regarding the size of a high-brightness area that is an image area of the linear image data 120 having a brightness greater than or equal to the first threshold value." In this embodiment, the high-brightness size information 124 corresponding to a divided area is generated for each of the plurality of divided areas. Specifically, for each of the plurality of divided areas, the high-brightness size information 124 corresponding to the divided area is generated, based on the brightness characteristic value acquired with respect to the divided area. The high-brightness size determination unit 105 outputs the high-brightness size information 124 to the correction parameter changing unit 107.

Processing of the high-brightness size determination unit 105 will be described more specifically. In this embodiment, a range in which the brightness value is greater than or equal to a brightness value (Y value) corresponding to the first threshold value is set as a high-brightness range 123 by the control unit 106. The high-brightness size determination unit. 105 generates a plurality of pieces of the high-brightness size information 124 corresponding to the plurality of divided areas, assuming that a pixel having a brightness value belonging to the high-brightness range 123 is a high-brightness pixel. Specifically, the high-brightness size determination unit 105 calculates a high-brightness size ratio, based on the brightness histogram information 122. The high-brightness size ratio is the proportion of the total frequency in the high-brightness range 123 of the brightness histogram to the total frequency in the entire range of the brightness histogram (total number of pixels of image data corresponding to the divided area). For each of the plurality of divided areas, the high-brightness size determination unit 105 calculates the high-brightness size ratio corresponding to the divided area, based on the brightness histogram information 122 corresponding to the divided area. Information showing the high-brightness size ratio is generated as the high-brightness size information 124.

A method of determining the high-brightness range 123 is not particularly limited. For example, the high-brightness range 123 may be a fixed range determined in advance by a manufacturer, a range that can be changed by a user, or a range determined and changed by the image display apparatus 100. A high-brightness threshold value that is a brightness value corresponding to the first threshold value may be used instead of the high-brightness range 123. The high-brightness size information 124 may be generated, assuming that a pixel having a brightness value greater than or equal to the high-brightness threshold value is a high-brightness pixel. The first threshold value may be a fixed value determined in advance by a manufacturer, a value that can be changed by a user, or a value determined and changed by the image display apparatus 100.

The high-brightness size information 124 is not limited to the information described above. For example, the high-brightness size ratio may be the proportion of the total frequency in the high-brightness range 123 of the brightness histogram to the total number of pixels of the linear image data 120 (total number of pixels in the entire screen). Information showing the number of high-brightness pixels may be generated as the high-brightness size information 124. A method of generating the high-brightness size information 124 is not limited to the method described above. For example, a plurality of pieces of the high-brightness size information 124 corresponding to the plurality of divided areas may be generated from one brightness characteristic value corresponding to the entire screen. The brightness data 121 described above may be acquired as the one brightness characteristic value corresponding to the entire screen. The plurality of pieces of the high-brightness size information 124 (numbers or proportions of high-brightness pixels) corresponding to the plurality of divided areas can be generated from the brightness data 121 corresponding to the entire screen. One piece of the high-brightness size information 124 corresponding to the entire screen may be generated, instead of the plurality of pieces of the high-brightness size information 124 corresponding to the plurality of divided areas.

By the correction parameter changing unit 107 and the display unevenness correction unit 108, unevenness reduction processing is performed on input image data (the linear image data 120). The unevenness reduction processing is image processing of reducing unevenness (display unevenness) in at least one of brightness and color that occurs in the screen, upon displaying an image based on the input image data (linear image data 120) in the screen of the display panel 110. Specifically, by the correction parameter changing unit 107 and the display unevenness correction unit 108, the unevenness reduction processing of reducing the display unevenness more strongly in a case where the number of high-brightness pixels is greater is performed on the linear image data 120, based on the high-brightness size information 124. In this embodiment, for each of the plurality of divided areas, unevenness reduction processing is performed on image data corresponding to the divided area, based on the high-brightness size information 124 generated with respect to the divided area.

The correction parameter changing unit 107 changes a correction parameter 125 based on the high-brightness size information 124, and outputs the correction parameter after change to the display unevenness correction unit 108 as a changed correction parameter 129. The correction parameter is a parameter used in the unevenness reduction processing and is a parameter with which the display unevenness is reduced. In this embodiment, for each of the plurality of divided areas, the changed correction parameter 129 corresponding to the divided area is determined, based on the high-brightness size information 124 generated with respect to the divided area. The correction parameter 125 is set by the control unit 106. The correction parameter 125 may be a fixed value specified in advance by a manufacturer or a value that can be changed by a user. The pattern in which the display unevenness occurs depends on a display panel. Therefore, it is desirable that the correction parameter 125 be generated separately with respect to each display panel.

An example of a method of generating the correction parameter 125 will be described. First, in a state where an image (solid image) based on image data of which the gradation value is uniform is displayed in the screen, the display brightness in each divided area is measured using a measuring instrument. The display brightness is the brightness on the screen. With the measuring instrument, the average display brightness in the divided areas is measured. The solid image is, for example, a white image in which the pixel values of all pixels are pixel values for white.

Next, based on the measured value of display brightness, the correction parameter 125 of each divided area is determined, such that the display brightness in the respective divided areas is made uniform. Herein, a coefficient by which each gradation value of image data in a divided area is multiplied is determined as the correction parameter 125. Specifically, in the case where the measured values of display brightness are non-uniform among the plurality of divided areas, brightness unevenness (unevenness in brightness) occurs in the screen. Thus, a plurality of coefficients corresponding to the plurality of divided areas are determined, such that the display brightness of a divided area where the measured display brightness is high matches the minimum value of measured display brightness. In the unevenness reduction processing using such a coefficient, brightness unevenness is reduced by reducing the display brightness at least partially. Therefore, the display brightness of the entire screen decreases.

The display unevenness correction unit 108 generates corrected image data 126 by performing unevenness reduction processing using the changed correction parameter 129 on the linear image data 120. Specifically, for each of the plurality of divided areas, the display unevenness correction unit 108 multiplies each gradation value of the image data in the divided area by the changed correction parameter 129 (coefficient) corresponding, to the divided area. Accordingly, the corrected image data 126 is generated. The display unevenness correction unit 108 then outputs the corrected image data 126 to the gamma conversion unit 109.

A method of the unevenness reduction processing is not particularly limited. The display unevenness may be reduced by any method, as long as the display unevenness can be reduced. For example, unevenness reduction processing in which the brightness is adjusted in units of pixels, instead of units of divided areas, may be performed. As the correction parameter, an offset value to be added to the gradation value may be used.

The gamma conversion unit 109 generates display image data 127 by performing, on the corrected image data 126, gamma conversion processing based on the display characteristics (gamma value) of the display panel 110. In this embodiment, gamma conversion processing using a gamma characteristics parameter (gamma curve) set by the control unit 106 is performed. The gamma value of the display panel 110 is 1/2.2, for example. The gamma conversion unit 109 outputs the display image data 127 to the display panel 110. The display characteristics of the display panel 110 are, for example, characteristics regarding the correspondence relationship of the gradation value input to the display panel 110 and the state of a display element of the display panel 110. In the case where the display panel 110 is a liquid crystal panel, the state of the display element is the transmittance of the display element. In the case where the display element of the display panel 110 is a light-emitting element (such as an organic EL element or plasma element), the state of the display element is the brightness of light emitted by the display element. The display characteristics of the display panel 110 depend on the type of the display element, for example.

The display panel 110 is a display unit that displays, on the screen, an image based on image data input to the display panel 110. In this embodiment, the display image data 127 is input to the display panel 110. For the display panel 110, a liquid crystal panel, an organic EL panel, a plasma panel, or the like can be used.

Next, an example of processing of the image display apparatus 100 will be described in detail. First, a specific method of generating the high-brightness size information 124 will be described. The gradation characteristics conversion unit 102 converts the gradation characteristics of the input image data 101 in which the number of bits is 10, from log characteristics to linear characteristics. Accordingly, the linear image data 120 in which the number of bits is 14 is generated. The brightness conversion unit 103 converts each pixel value (RGB value) of the linear image data 120 to the brightness value (Y value). Accordingly, the brightness data 121 is generated. For example, the Y value is calculated using expression 1. The number of bits of the Y value is not particularly limited. Herein, a 14-bit Y value is calculated.

$$Y\text{ value} = 0.299 \times R\text{ value} + 0.587 \times G\text{ value} + 0.114 \times B\text{ value} \quad \text{(Expression 1)}$$

Figure 3:
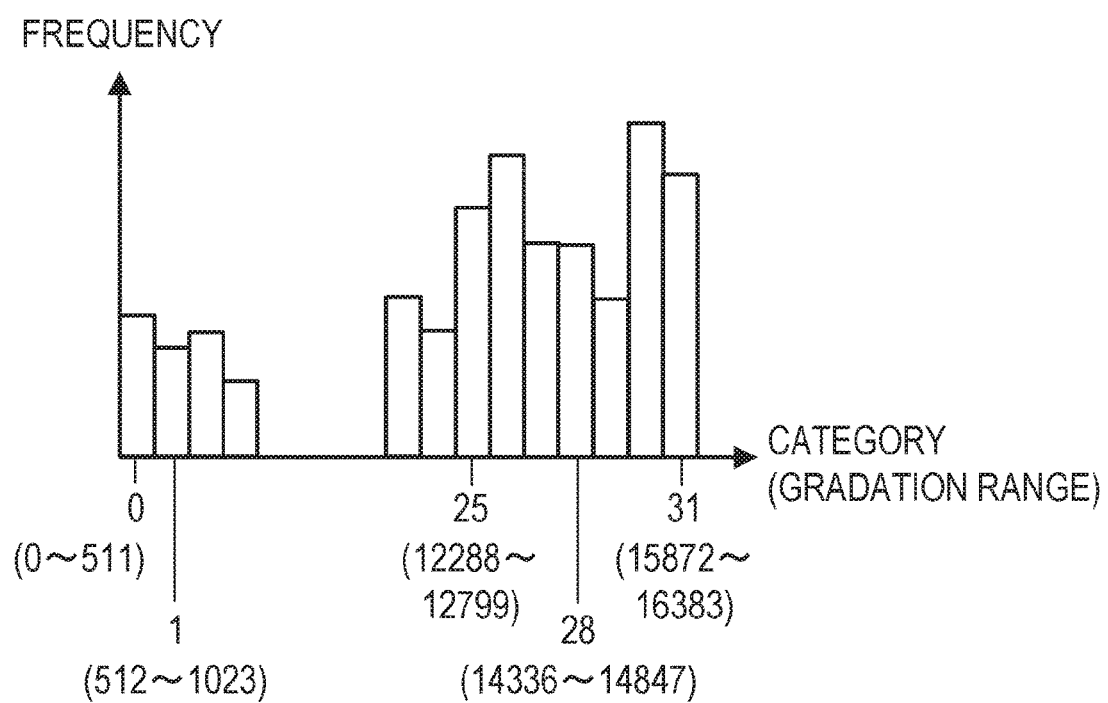
FIG. 3 is a diagram showing an example of a brightness histogram according to Embodiment 1.

The brightness histogram generation unit 104 generates a brightness histogram of each divided area from the brightness data 121. Herein, as shown in FIG. 3, the range of gradation value (Y value) of the brightness data 121 is divided into 32 categories of category 0 to category 31. For each of the 32 categories, the number of pixels (pixels of the brightness data 121) having a Y value belonging to the category is counted. Accordingly, the brightness histogram is generated. In the case where the brightness data 121 includes many pixels having a high Y value, a large value is obtained as the frequency (number of pixels) of a category corresponding to a high Y value, as shown in FIG. 3. The brightness histogram generation unit 104 outputs information representing the generated brightness histogram (frequency of each category) as the brightness histogram information 122.

For each of the plurality of divided areas, the high-brightness size determination unit 105 calculates the high-brightness size ratio corresponding to the divided area, based on the brightness histogram information 122 corresponding to the divided area. The high-brightness size determination unit 105 generates information showing the high-brightness size ratio as the high-brightness size information 124. As described above, the high-brightness size ratio is the proportion of the total frequency in the high-brightness range 123 of the brightness histogram to the total frequency in the entire range of the brightness histogram. Herein, the high-brightness range 123 is a range corresponding to the amount of decrease in display brightness due to the unevenness reduction processing using the correction parameter 125.

Figure 4:
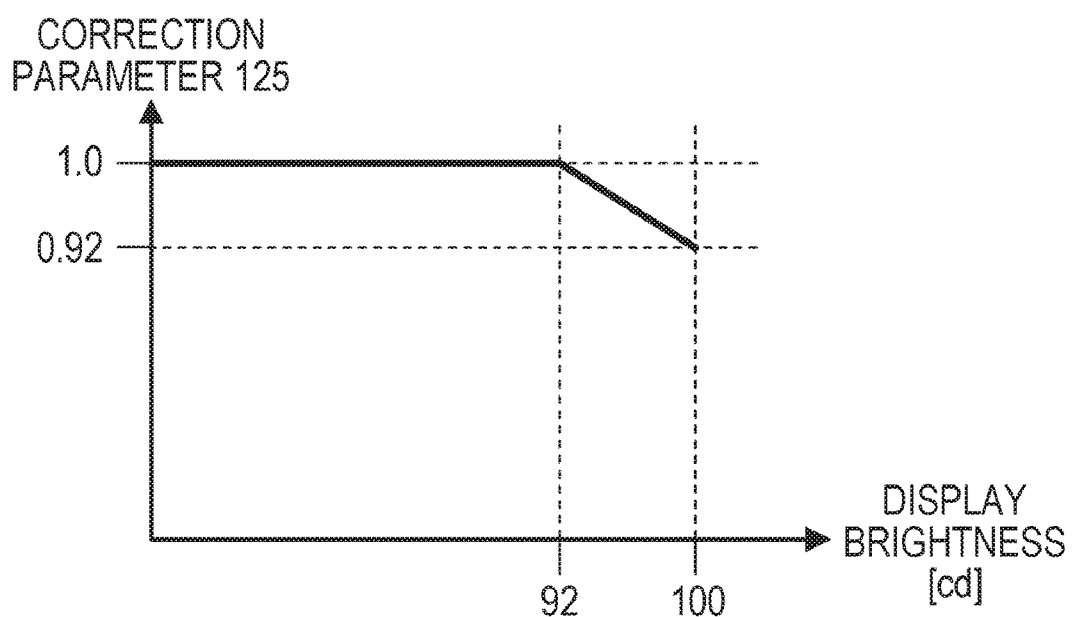
FIG. 4 is a diagram showing an example of the relationship of display brightness and a correction parameter according to Embodiment 1.

An example will be described in which the display brightness of the entire screen is decreased by 8% by the unevenness reduction processing using the correction parameter 125. FIG. 4 shows an example of the correspondence relationship of the measured value of display brightness and the correction parameter 125 (coefficient). Herein, the upper limit value of display brightness is assumed as 100 cd. By determining the correction parameter 125 using the correspondence relationship in FIG. 4, the correction parameter 125 with which the display brightness of the entire screen is decreased by 8% is obtained as the correction parameter 125 of each divided area. According to the correspondence relationship in FIG. 4, 0.92 is obtained as the correction parameter 125 with respect to a divided area where the measured display brightness is 100 cd, and 1.0 is obtained as the correction parameter 125 with respect to a divided area where the measured display brightness is 92 cd.

While the example in which the display brightness is decreased by 8% has been described, the amount of decrease in display brightness changes depending on the pattern in which the display unevenness occurs. That is, the correspondence relationship of the measured value of display brightness and the correction parameter 125 is not limited to the correspondence relationship in FIG. 4. The correspondence relationship of the measured value of display brightness and the correction parameter 125 changes depending on the pattern in which the display unevenness occurs.

A specific method of calculating the high-brightness size ratio will be described. First, the high-brightness size determination unit 105 determines, from the high-brightness range 123, a category corresponding to the high-brightness range 123 as a high-brightness category. Herein, the display brightness of the entire screen is decreased by 8% by the unevenness reduction processing using the correction parameter 125. Therefore, a range of 14336 to 16383 that is a range of the highest 8% in 14-bit brightness value (Y value) is set as the high brightness range 123. A category corresponding to the range of 14336 to 16383 (four highest categories in FIG. 3) is determined as the high-brightness category.

Next, the high-brightness size determination unit 105 calculates a sum (first sum) of frequencies of the four high-brightness categories. Then, the high-brightness size determination unit 105 calculates the high-brightness size ratio by dividing the first sum by a sum (second sum) of frequencies of all categories. The second sum is the total number of pixels of image data corresponding to a divided area. For example, in the case where the first sum is 800 and the second sum is 100, 0.8 is calculated as the high-brightness size ratio. A greater value is calculated as the high-brightness size ratio, in a case where the number of pixels belonging to a high-brightness category is greater. In other words, a greater value is calculated as the high-brightness size ratio, in a case where the number of pixels in which the brightness s decreased by the unevenness reduction processing using the correction parameter 125 is greater.

Next, a specific method of calculating the changed correction parameter 129 will be described. The correction parameter changing unit 107 changes the correction parameter 125 in accordance with the high-brightness size ratio shown by the high-brightness size information 124. As described above, the display brightness of the entire screen is decreased by 8% by the unevenness reduction processing using the correction parameter 125. In the correction parameter changing unit 107, the correction parameter 125 is changed in accordance with the high-brightness size ratio, such that the decrease in display brightness is suppressed.

The display unevenness in an area formed of high-brightness pixels (high-brightness area) is less noticeable in a case where the number of the high-brightness pixels is smaller. Specifically, the display unevenness in a high-brightness area is less noticeable in a case where the size of the high-brightness area is smaller. The size of the high-brightness area is presumably smaller (the number of high-brightness pixels is smaller) in a case where the high-brightness size ratio is smaller. That is, the display unevenness in the high-brightness area is presumably less noticeable in a case where the high-brightness size ratio is smaller.

Figure 5:
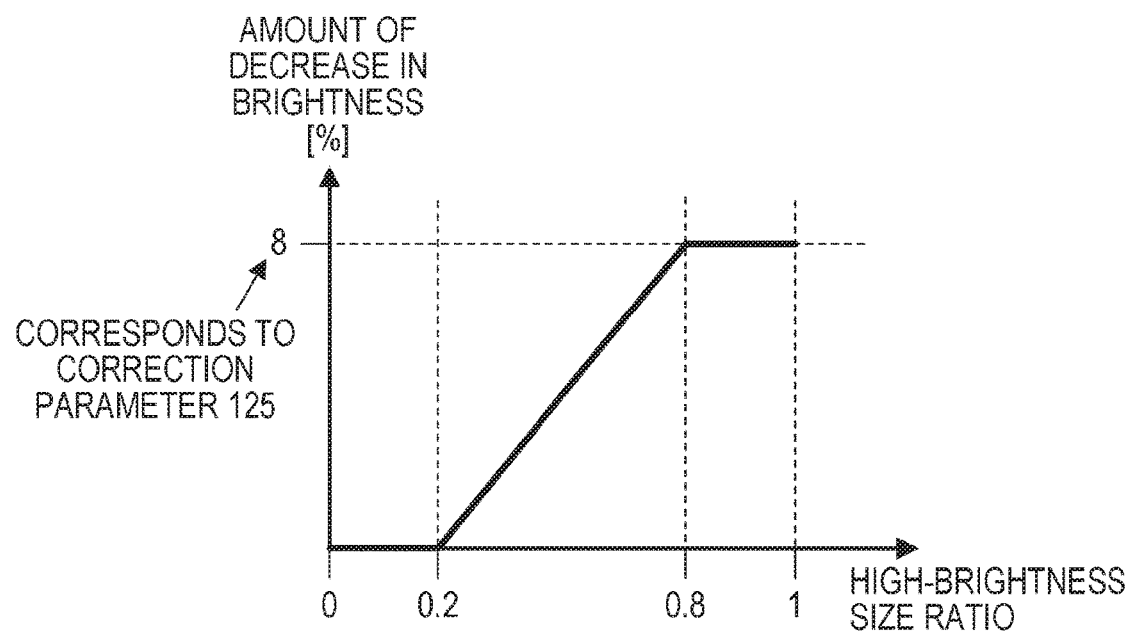
FIG. 5 is a diagram showing an example of the relationship of a high-brightness size ratio and an amount of decrease in brightness according to Embodiment 1.

Herein, it is assumed that the display unevenness (deterioration of image quality due to display unevenness) is unnoticeable in a high-brightness area having a size corresponding to 0.2 or less in high-brightness size ratio. In a high-brightness area where the display unevenness is unnoticeable, maintaining the display brightness should be prioritized over reducing the display unevenness. Therefore, in the case where the high-brightness size ratio is less than or equal to 0.2, as shown in FIG. 5, the correction parameter changing unit. 107 changes the correction parameter 125 such that the amount of decrease in display brightness due to the unevenness reduction processing is 0%. Specifically, the correction parameter changing unit 107 determines a coefficient of 1.0 as the changed correction parameter 129.

On the other hand, in a high-brightness area where the display unevenness is noticeable, reducing the display unevenness should be prioritized over maintaining the display brightness. Herein, it is assumed that the display unevenness is highly noticeable in a high-brightness area having a size corresponding to 0.8 or greater in high-brightness size ratio. Therefore, in the case where the high-brightness size ratio is greater than or equal to 0.8, the correction parameter changing unit 107 determines the correction parameter 125 as the changed correction parameter 129. FIG. 5 shows an example of a case where the correction parameter 125 has been determined such that the display brightness is decreased by 8%. Therefore, in FIG. 5, the changed correction parameter 129 is determined such that the amount of decrease in display brightness due to the unevenness reduction processing is 8%.

In the case where a high-brightness size ratio of 0.2 to 0.8 has been calculated in the example of FIG. 5, the changed correction parameter 129 is determined such that the changed correction parameter 129 increases from 1.0 to the same value as the correction parameter 125, as the high-brightness size ratio increases.

A method of determining the changed correction parameter 129 is not limited to the method described above. The changed correction parameter 129 may be determined by any method, as long as unevenness reduction processing of reducing the display unevenness more strongly in a case where the number of high-brightness pixels is greater is realized. In FIG. 5, a range of the high-brightness size ratio (0 to 0.2 and 0.8 to 1) in which the amount of decrease in display brightness does not change is set. However, the changed correction parameter 129 may increase in the entire range of the high-brightness size ratio, as the high-brightness size ratio increases. The upper limit value of the changed correction parameter 129 may be greater than or smaller than the correction parameter 125. The correspondence relationship of the amount of decrease in display brightness and the high-brightness size ratio is not particularly limited, as long as unevenness reduction processing of reducing the display unevenness more strongly in a case where the number of high-brightness pixels is greater is realized.

The unevenness reduction processing of reducing the display unevenness more strongly in a case where the number of high-brightness pixels is greater may be realized by changing the method of unevenness reduction processing, based on the high-brightness size information 124, instead of changing the correction parameter.

With this embodiment, as described above, the unevenness reduction processing of reducing the display unevenness more strongly in a case where the number of high-brightness pixels is greater is performed. Accordingly, a decrease in display brightness can suitably be suppressed, and display unevenness can suitably be reduced. Specifically, in the case where display unevenness is noticeable, unevenness reduction processing that prioritizes reducing the display unevenness over maintaining the display brightness can be performed. In the case where display unevenness is unnoticeable, unevenness reduction processing that prioritizes maintaining the display brightness over reducing the display unevenness can be performed.

While an example in which the brightness value of each pixel is acquired as the brightness characteristic value has been described in this embodiment, the brightness characteristic value is not as such. For example, for each of the plurality of divided areas, an average brightness value of image data corresponding to the divided area may be acquired as the brightness characteristic value corresponding to the divided area. In that case, it can be presumed that the size of a high-brightness area is bigger in a case where the average brightness value is higher, or that the number of high-brightness pixels is greater in a case where the average brightness value is higher. Therefore, in the case where the average brightness value is acquired as the brightness characteristic value, it suffices to generate high-brightness size information showing that the number of high-brightness pixels is greater in a case where the average brightness value is higher. For example, it suffices to calculate a greater high-brightness size ratio in a case where the average brightness value is higher.

While an example in which the high-brightness range 123 is determined based on the correction parameter 125 has been described in this embodiment, the method of determining the high-brightness range 123 is not particularly limited. For example, the high-brightness range 123 may be determined in accordance with the setting of the image display apparatus 100 in accordance with user operation.

In an area other than a high-brightness area, reducing the display unevenness is often more important than maintaining the display brightness. Therefore, unevenness reduction processing of reducing the display brightness strongly regardless of the number of high-brightness pixels may be performed with respect to an area other than a high-brightness area. For example, in the unevenness reduction processing with respect to an area other than a high-brightness area, the correction parameter 125 may be used regardless of the number of high-brightness pixels. The unevenness reduction processing of reducing the display unevenness more strongly in a case where the number of high-brightness pixels is greater may be performed with respect to a high-brightness area.

Embodiment 2

An image-processing apparatus and an image-processing method according to Embodiment 2 of the present invention will be described below. In this embodiment, an example will be described in which a decrease in display brightness can more suitably be suppressed, and display unevenness can more suitably be reduced. Descriptions on the configurations and processing similar to those in Embodiment 1 will be omitted.

Figure 7A:
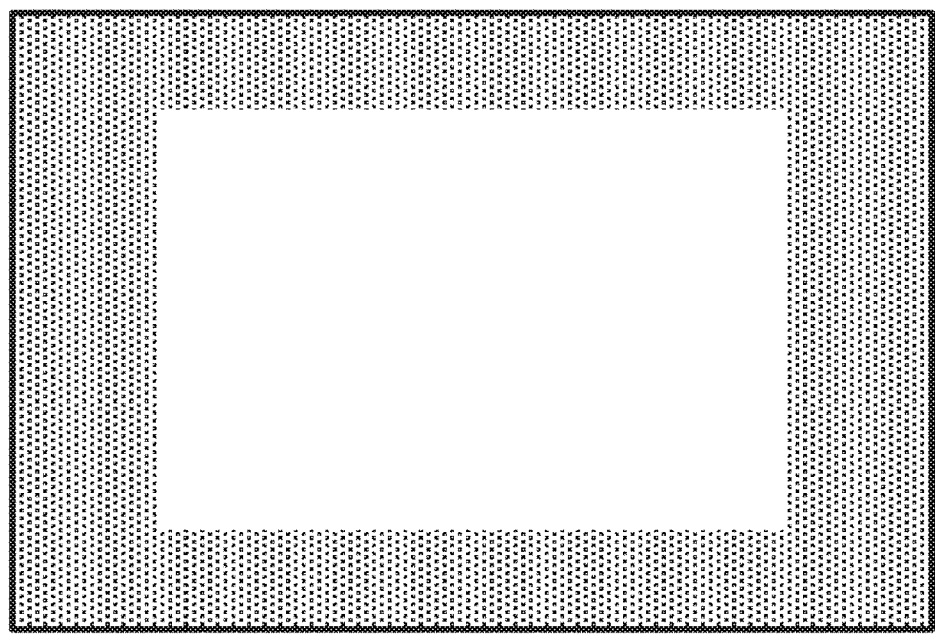
FIGS. 7A and 7B are representations showing an example of an image according to Embodiment 2.
Figure 7B:
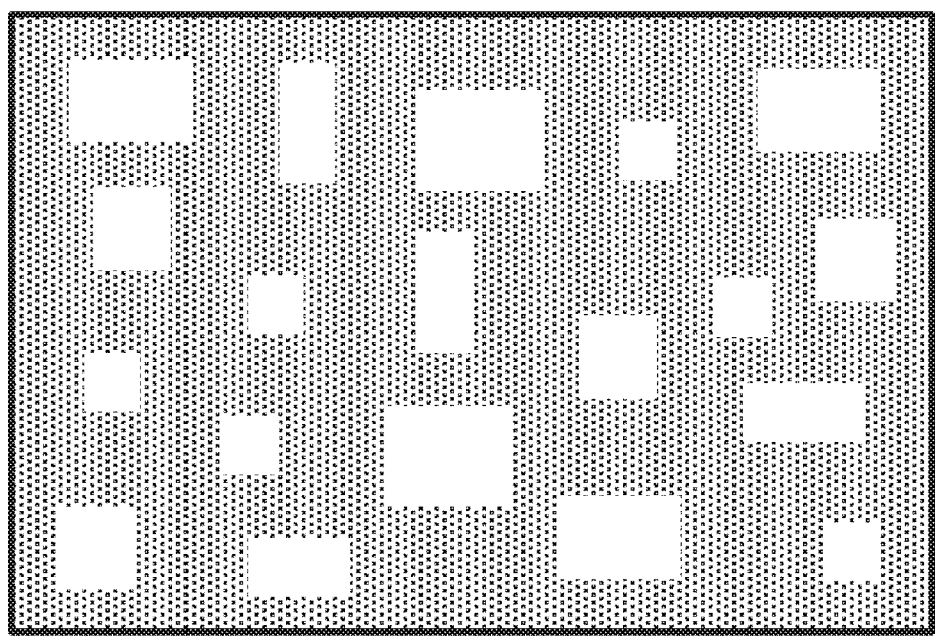
Figure 10:
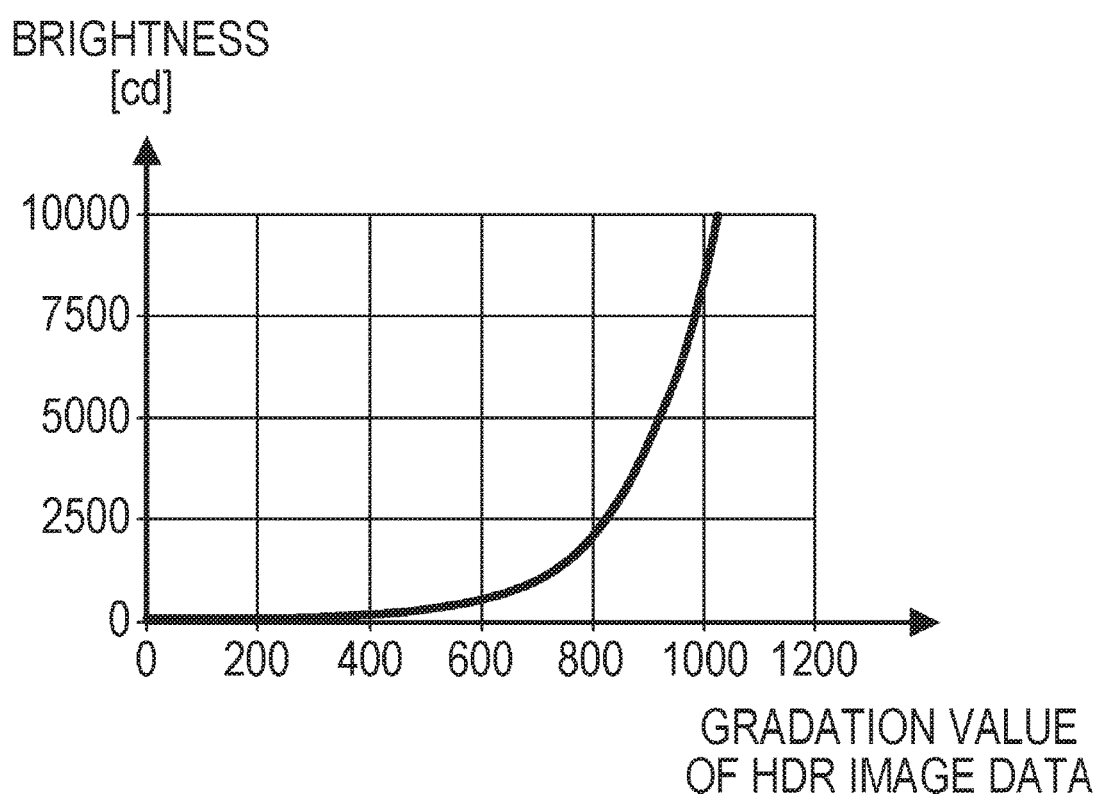
FIG. 10 is a diagram showing an example of conversion characteristics upon converting HDR image data to brightness.

FIGS. 7A and 7B are representations showing an example of an image represented by input image data. In FIGS. 7A and 7B, a white area is a high-brightness area. In the case where the number of high-brightness pixels is large and the plurality of high-brightness pixels are concentrated in a partial area as shown in FIG. 7A, the display unevenness in the high-brightness area is noticeable. However, in the case where the number of high-brightness pixels is large, but the plurality of high-brightness pixels exist in a dispersed manner as shown in FIG. 7B, the display unevenness in the high-brightness area is less noticeable.

Since the correction parameter is determined based on only the high-brightness size ratio in Embodiment 1, unevenness reduction processing of reducing the display unevenness excessively may be performed with respect to image data with which the display unevenness in a high-brightness area is less noticeable. For example, unevenness reduction processing of reducing the display unevenness excessively may be performed with respect to image data as in FIG. 7B.

Thus, in this embodiment, a correction parameter is determined further in consideration of the degree of dispersion of high-brightness pixels. Accordingly, unevenness reduction processing is realized such that the display unevenness is reduced more strongly in a case where the degree of dispersion of high-brightness pixels is lower, in the case where the number of high-brightness pixels is constant. As a result, a decrease in display brightness can more suitably be suppressed, and display unevenness can more suitably be reduced. For example, unevenness reduction processing that prioritizes maintaining the display brightness over reducing the display unevenness can be performed with respect to image data representing an image as in FIG. 7B.

Figure 6:
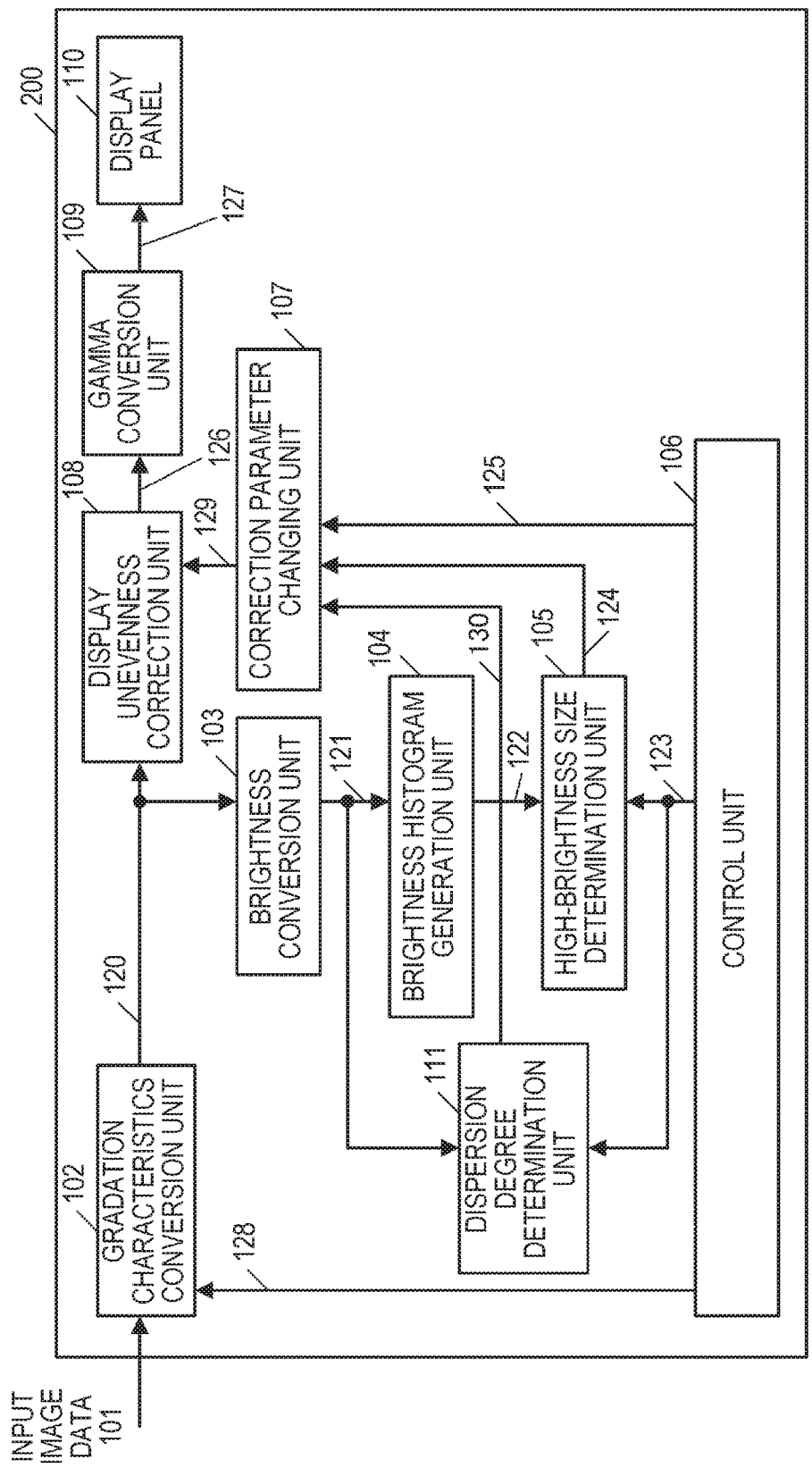
FIG. 6 is a block diagram showing an example of the functional configuration of an image display apparatus according to Embodiment 2.

FIG. 6 is a block diagram showing an example of the functional configuration of an image display apparatus 200 according to this embodiment. As shown in FIG. 6, the image display apparatus 200 further includes a dispersion degree determination unit ill, in addition to functional units included in the image display apparatus 100 of Embodiment 1.

In this embodiment, information regarding the number of high-brightness pixels and the degree of dispersion of high-brightness pixels is generated by the high-brightness size determination unit 105 and the dispersion degree determination unit 111. Specifically, in a similar manner to Embodiment 1, the high-brightness size information 124 is generated by the high-brightness size determination unit 105. The information regarding the degree of dispersion of high-brightness pixel s is generated as dispersion information 130 by the dispersion degree determination unit 111.

The dispersion degree determination unit 111 generates the dispersion information 130, based on the brightness data 121 and the high-brightness range 123. The dispersion degree determination unit 111 outputs the dispersion information 130 to the correction parameter changing unit 107.

Processing of the dispersion degree determination unit 111 will be described in detail. First, the dispersion degree determination unit 111 detects a high-brightness pixel from the brightness data 121, based on the high-brightness range 123. A pixel having a brightness value belonging to the high-brightness range 123 is detected as the high-brightness pixel.

Next, the dispersion degree determination unit 111 counts the number of high-brightness edge pixels that are high-brightness pixels with a brightness difference (difference in Y value) greater than or equal to a second threshold value relative to an adjacent pixel. Specifically, the dispersion degree determination unit 111 divides the range of brightness difference into 32 categories (difference categories) as shown in FIG. 8. For each of the 32 difference categories, the dispersion degree determination unit 111 counts the number of pixels (pixels of the brightness data 121) having a brightness difference belonging to the difference category. The dispersion degree determination on unit 111 calculates, as the number of high-brightness edge pixels, a sum (third sum) of frequencies of difference categories corresponding to a range greater than or equal to the second threshold value. In this embodiment, the processing is performed for each of a plurality of divided areas. A pixel of which the brightness difference relative to an adjacent pixel is greater than or equal to the second threshold value is likely a pixel forming the edge of a high-brightness area. The second threshold value may be a fixed value determined in advance by a manufacturer, a value that can be changed by a user, or a value determined and changed by the image display apparatus 200.

One pixel has a plurality of adjacent pixels. For the brightness difference to be compared with the second threshold value, a brightness difference relative to an adjacent pixel in one direction may be used, or it may be otherwise. For each of a plurality of directions, a brightness difference relative to a pixel adjacent in the direction may be calculated. A plurality of representative values of the brightness difference (such as the maximum value, the minimum value, the median value, the mode value, or the average value) may be compared with the second threshold value.

The dispersion degree determination unit 111 generates information regarding the number of high-brightness edge pixels as the dispersion information 130. In this embodiment, the dispersion information 130 is generated for each of the plurality of divided areas. Specifically, the dispersion degree determination unit. 111 calculates a high-brightness edge ratio by dividing the third sum by a sum (fourth sum) of frequencies of all difference categories. The fourth sum is the total number of pixels of image data corresponding to a divided area. The dispersion degree determination unit 111 generates information showing the high-brightness edge ratio as the dispersion information 130.

For example, in the case where the third sum is 80 and the fourth sum is 100, 0.8 is calculated as the high-brightness edge ratio. In a case where the number of high-brightness edge pixels is greater, it is likely that the degree of dispersion of the plurality of high-brightness pixels is greater. Therefore, the information regarding the number of high-brightness edge pixels can be used as the dispersion information 130. In this embodiment, a greater value is calculated as the high-brightness edge ratio, in a case where the number of high-brightness edge pixels is greater.

The dispersion information 130 is not limited to the information described above. For example, the high-brightness edge ratio may be the proportion of the number of high-brightness edge pixels to the total number of pixels of the linear image data 120 (total number of pixels in an entire screen). Information showing the number of high-brightness edge pixels may be generated as the dispersion information 130. One piece of the dispersion information 130 corresponding to the entire screen may be generated. Any information may be generated as the dispersion information 130, as long as the information regards the degree of dispersion of high-brightness edge pixels. From the result of detection of high-brightness edge pixels, the dispersion information 130 with various definitions can be generated.

The correction parameter changing unit 107 generates the changed correction parameter 129 by changing the correction parameter 125, based on the high-brightness size information 124 and the dispersion information 130. In this embodiment, the changed correction parameter 129 is generated such that unevenness reduction processing is performed to reduce the display unevenness more strongly in a case where the degree of dispersion of high-brightness pixels is lower, in the case where the number of high-brightness pixels is constant. Specifically, the changed correction parameter 129 is generated such that unevenness reduction processing is performed to reduce the display unevenness more strongly in a case where the number of high-brightness edge pixels is smaller, in the case where the number of high-brightness pixels is constant.

Processing of the correction parameter changing unit 107 will be described in detail. First, the correction parameter changing unit 107 subtracts the high-brightness edge ratio shown by the dispersion information 130 from the high-brightness size ratio shown by the high-brightness size information 124. The correction parameter changing unit 107 generates the changed correction parameter 129 by changing the correction parameter 125, based on the result of subtraction. For example, the changed correction parameter 129 is generated such that the correspondence relationship of the result of subtraction and the amount of decrease in display brightness due to unevenness reduction processing is a correspondence relationship in FIG. 9. FIG. 9 shows an example of a case where the correction parameter 125 has been determined such that the display brightness is decreased by 8%. In this embodiment, the processing is performed for each divided area.

A method of determining the changed correction parameter 129 is not limited to the method described above. The changed correction parameter 129 may be determined by any method, as long as unevenness reduction processing is realized such that the display unevenness is reduced more strongly in a case where the degree of dispersion of high-brightness pixels is lower, in the case where the number of high-brightness pixels is constant. For example, the changed correction parameter 129 may be determined by changing the correction parameter 125 by a method similar to that in Embodiment 1 and then further correcting the correction parameter after change, based on the dispersion information 130. The unevenness reduction processing described above may be realized by changing a method of the unevenness reduction processing, based on the high-brightness size information 124 and the dispersion information 130, instead of changing the correction parameter.

As described above, with this embodiment, unevenness reduction processing is performed such that display unevenness is reduced more strongly in a case where the degree of dispersion of high-brightness pixels is lower, in the case where the number of high-brightness pixels is constant. Accordingly, a decrease in display brightness can more suitably be suppressed, and display unevenness can more suitably be reduced.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions or one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-Ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-166561, filed on Aug. 26, 2015, which is hereby incorporated by reference herein in its entirety.

What is claimed is:

1. An image display apparatus comprising
an acquiring unit configured to acquire brightness characteristic values from input image data;
a generating unit configured to generate information regarding a high-brightness area of the input image data having a brightness greater than or equal to a first threshold value, based on the brightness characteristic values acquired by the acquiring unit;
a processing unit configured to generate display image data from the input image data, wherein:
    (1) in a case where the proportion of the high-brightness area to the image area of the input image data is greater than a predetermined proportion, the processing unit generates the display image data by performing, on the input image data, unevenness reduction processing of reducing unevenness in at least one of brightness and color, and
    (2) in a case where the proportion of the high-brightness area to the image area of the input image data is equal to or less than the predetermined proportion, the processing unit generates the display image data from the input image data without performing, on the input image data, the unevenness reduction processing, and
a display unit configured to display, on a screen, an image based on the display image data generated by the processing unit, wherein
    the unevenness reduction processing includes a processing to reduce brightness of at least a part of the input image data so as to reduce brightness unevenness occurring in the screen when an image based on the input image data of which the gradation values are uniform is displayed on the screen.

2. The image display apparatus according to claim 1, wherein the acquiring unit acquires a brightness value of each pixel of the input image data as the brightness characteristic value.

3. The image display apparatus according to claim 1, wherein the acquiring unit acquires, for each of a plurality of divided areas forming the screen, an average brightness value of image data corresponding to the divided area as the brightness characteristic value corresponding to the divided area.

4. The image display apparatus according to claim 1, wherein the generating unit generates, for each of a plurality of divided areas forming the screen, information regarding the high-brightness area corresponding to the divided area.

5. The image display apparatus according to claim 1, wherein the information regarding the high-brightness area is information regarding the proportion of number of high-brightness pixels to total number of pixels of the input image data, the high-brightness pixels being pixels of the input image data having a brightness greater than or equal to the first threshold value.

6. The image display apparatus according to claim 1, wherein the generating unit generates information regarding the number of high-brightness pixels and a degree of dispersion of the high-brightness pixels, the high-brightness pixels being pixels of the input image data having a brightness greater than or equal to the first threshold value, and
wherein, in a case where the number of high-brightness pixels is constant, (1) in a case where the degree of dispersion of the high-brightness pixels is lower than a predetermined value, the processing unit generates the display image data by performing, on the input image data, the unevenness reduction processing, and (2) in a case where the degree of dispersion of the high-brightness pixels is equal to or higher than the predetermined value, the processing unit generates the display image data from the input image data without performing, on the input image data, the unevenness reduction processing.

7. The image display apparatus according to claim 1, wherein the generating unit generates information regarding the number of high-brightness pixels and number of high-brightness edge pixels, the high-brightness pixels being pixels of the input image data having a brightness greater than or equal to the first threshold value, and high-brightness edge pixels being high-brightness pixels with a brightness difference greater than or equal to a second threshold value relative to an adjacent pixel, and
wherein, in a case where the number of high-brightness pixels is constant, (1) in a case where the number of high-brightness edge pixels is smaller than a predetermined number, the processing unit generates the display image data by performing, on the input image data, the unevenness reduction processing, and (2) in a case where the number of high-brightness edge pixels is equal to or larger than the predetermined number, the processing unit generates the display image data from the input image data without performing, on the input image data, the unevenness reduction processing.

8. The image display apparatus according to claim 1, wherein the acquiring unit acquires, for each of a plurality of divided areas forming the screen, the brightness characteristic value from image data corresponding to the divided area,
wherein the generating unit generates, for each of the plurality of divided areas, information regarding the high-brightness area corresponding to the divided area, based on the brightness characteristic value acquired with respect to the divided area, and
wherein the processing unit performs, for each of the plurality of divided areas, the unevenness reduction processing on the image data corresponding to the divided area, based on the information generated with respect to the divided area.

9. The image display apparatus according to claim 1, further comprising a converting unit configured to convert non-linear data that is image data of which a gradation value increases non-linearly with respect to an increase in brightness to linear image data that is image data of which a gradation value increases linearly with respect to an increase in brightness,
wherein the acquiring unit acquires the brightness characteristic value from the linear image data, and
wherein the processing unit performs the unevenness reduction processing on the linear image data.

10. An image display method comprising:
an acquiring step of acquiring brightness characteristic values from input image data;
a generating step of generating information regarding a high-brightness area of the input image data having a brightness greater than or equal to a first threshold value, based on the brightness characteristic values acquired in the acquiring step;

a processing step of generating display image data from the input image data, wherein
(1) in a case where the proportion of the high-brightness area to the image area of the input image data is greater than a predetermined proportion, in the processing step, the display image data is generated by performing, on the input image data, unevenness reduction processing of reducing unevenness in at least one of brightness and color, and
(2) in a case where the proportion of the high-brightness area to the image area of the input image data is equal to or less than the predetermined proportion, in the processing step, the display image data is generated from the input image data without performing, on the input image data, the unevenness reduction processing, and a display step of displaying, on a screen, an image based on the display image data generated in the processing step, wherein the unevenness reduction processing includes a processing to reduce brightness of at least a part of the input image data so as to reduce brightness unevenness occurring in the screen when an image based on the input image data of which the gradation values are uniform is displayed on the screen.

11. The image display method according to claim 10, wherein in the acquiring step, a brightness value of each pixel of the input image data is acquired as the brightness characteristic value.

12. The image display method according to claim 10, wherein in the acquiring step, for each of a plurality of divided areas forming the screen, an average brightness value of image data corresponding to the divided area is acquired as the brightness characteristic value corresponding to the divided area.

13. The image display method according to claim 10, wherein in the generating step, for each of a plurality of divided areas forming the screen, information regarding the high-brightness area corresponding to the divided area is generated.

14. The image display method according to claim 10, wherein the information regarding the high-brightness area is information regarding the proportion of number of high-brightness pixels to total number of pixels of the input image data, the high-brightness pixels being pixels of the input image data having a brightness greater than or equal to the first threshold value.

15. The image display method according to claim 10, wherein in the generating step, information regarding the number of high-brightness pixels and a degree of dispersion of the high-brightness pixels is generated, the high-brightness pixels being pixels of the input image data having a brightness greater than or equal to the first threshold value, and wherein, in a case where the number of high-brightness pixels is constant, (1) in a case where the degree of dispersion of the high-brightness pixels is lower than a predetermined value, in the processing step, the display image data is generated by performing on the input image data, the unevenness reduction processing, and (2) in a case where the degree of dispersion of the high-brightness pixels is equal to or higher than the predetermined value, in the processing step, the display image data is generated from the input image data without performing, on the input image data, the unevenness reduction processing.

16. The image display method according to claim 10, wherein in the generating step, information regarding the number of high-brightness pixels and number of high-brightness edge pixels, the high-brightness pixels being pixels of the input image data having a brightness greater than or equal to the first threshold value, and high-brightness edge pixels being high-brightness pixels with a brightness difference greater than or equal to a second threshold value relative to an adjacent pixel is generated, and wherein, in a case where the number of high-brightness pixels is constant, (1) in a case where the number of high-brightness edge pixels is smaller than a predetermined number, in the processing step, the display image data is generated by performing, on the input image data, the unevenness reduction processing, and (2) in a case where the number of high-brightness edge pixels is equal to or larger than the predetermined number, in the processing step, the display image data is generated from the input image data without performing, on the input image data, the unevenness reduction processing.

17. The image display method according to claim 10, wherein in the acquiring step, for each of a plurality of divided areas forming the screen, the brightness characteristic value is acquired from image data corresponding to the divided area, wherein in the generating step, for each of the plurality of divided areas, information regarding the high-brightness area corresponding to the divided area is generated based on the brightness characteristic value acquired with respect to the divided area, and wherein in the processing step, for each of the plurality of divided areas, the unevenness reduction processing is performed on the image data corresponding to the divided area, based on the information generated with respect to the divided area.

18. The image display method according to claim 10, further comprising a converting step of converting non-linear data that is image data of which a gradation value increases non-linearly with respect to an increase in brightness to linear image data that is image data of which a gradation value increases linearly with respect to an increase in brightness, wherein in the acquiring step, the brightness characteristic values are acquired from the linear image data, and wherein in the processing step, the unevenness reduction processing is performed on the linear image data.

19. A non-transitory computer readable medium that stores a program, wherein the program causes a computer to execute
an acquiring step of acquiring brightness characteristic values from input image data;
a generating step of generating information regarding a high-brightness area of the input image data having a brightness greater than or equal to a first threshold value, based on the brightness characteristic values acquired in the acquiring step;
a processing step of generating display image data from the input image data,
wherein
(1) in a case where the proportion of the high-brightness area to the image area of the input image data is greater than a predetermined proportion, in the processing step, the display image data is generated by performing, on the input image data, unevenness reduction processing of reducing unevenness in at least one of brightness and color, and
(2) in a case where the proportion of the high-brightness area to the image area of the input image data is equal to or less than the predetermined proportion, in the processing step, the display image data is generated from the input image data without performing, on the input image data, the unevenness reduction processing; and a display step of displaying, on a screen, an image based on the display image data generated in the processing step, wherein the unevenness reduction processing includes a processing to reduce brightness of at least a part of the input image data so as to reduce brightness unevenness occurring in the screen when an image based on the input image data of which the gradation values are uniform is displayed on the screen.

* * * * *